United States Patent [19]

DiFoggio

[11] Patent Number: 4,587,641
[45] Date of Patent: May 6, 1986

[54] DOWNHOLE FRACTURE ANALYSIS
[75] Inventor: Rocco DiFoggio, Houston, Tex.
[73] Assignee: Shell Oil Company, Houston, Tex.
[21] Appl. No.: 577,927
[22] Filed: Feb. 7, 1984
[51] Int. Cl.$^4$ ............................ G01V 1/00; G01V 1/40
[52] U.S. Cl. ........................................ 367/30; 367/27; 367/32; 367/35; 367/33; 181/105
[58] Field of Search ...................... 367/27, 32, 33, 34, 367/35, 40, 86, 911, 912, 30, 47; 181/102, 105

[56] References Cited
U.S. PATENT DOCUMENTS

| | | | |
|---|---|---|---|
| 3,205,941 | 9/1965 | Walker | 181/105 X |
| 3,588,800 | 6/1971 | Moore | 367/86 X |
| 3,832,677 | 8/1974 | Brenden et al. | |
| 3,881,168 | 4/1975 | Farr et al. | 367/86 X |
| 4,046,220 | 9/1977 | Glen, Jr. | 367/35 X |
| 4,114,721 | 9/1978 | Glenn, Jr. | 181/102 X |
| 4,130,816 | 12/1978 | Vogel et al. | 367/35 |
| 4,168,483 | 9/1979 | Parthasarathy et al. | 181/105 X |
| 4,255,798 | 3/1981 | Havira . | |
| 4,283,953 | 8/1981 | Plona | 367/86 X |
| 4,328,567 | 5/1982 | Dodge | 367/32 |
| 4,355,357 | 10/1982 | Chan | 367/33 X |
| 4,415,998 | 11/1983 | Blizard | 367/912 X |

FOREIGN PATENT DOCUMENTS 1193382 5/1970 United Kingdom .
1321271 6/1973 United Kingdom .

OTHER PUBLICATIONS

Ser. No. 577,927, filed Feb. 7, 1984, "Principles and Application of Ultrasonic Spectroscopy in NDE of Adhesive Bonds", Chang et al, IEEE Transactions on Sonics and Ultrasonics, vol. SU-23, No. 5, Sep. 1976.
"Detection of Delaminations by Ultrasonic Spectroscopy", Gericke et al., IEEE Transactions on Sonics and Ultrasonics, vol. SU-23, No. 5, Sep. 1976.
"Application of Correlation Techniques for Localization of Acoustic Emission Sources", author unknown (Ljubljana, Yugoslavia), Ultrasonics, 1978 IPC Business Press Ltd., May 1978.
"Acoustic Emissions in Geotechnical Engineering Practice", Drnevich et al., ASTM Technical Publication 750, Jun. 1981.
"Application of Random Signal Correlation Techniques to Ultrasonic Flaw Detection", Furgason et al, Ultrasonics, Jan. 1975.
"Digital Correlators from Langley Ford, the 1096", Descriptive Brochure from Langley Ford Instruments, 29 Cottage Street, Amherst, MA 01002.
"Evaluation of a Random Signal Correlation System for Ultrasonic Flaw Detection", Bilgutay et al, IEEE Transactions on Sonics and Ultrasonics, vol. SU-23, No. 5, Sep. 1976.

Primary Examiner—Charles T. Jordan
Assistant Examiner—Brian Steinberger

[57] ABSTRACT

A method and apparatus using a multiple transducer acoustic logging tool to detect fractures surrounding a borehole, particularly fractures that do not intersect the borehole wall. The transducers are actuated to produce broad band width pulses and signal enhancement techniques are used to determine fracture width, orientation and distance from the borehole wall.

7 Claims, 4 Drawing Figures

FIG. 1
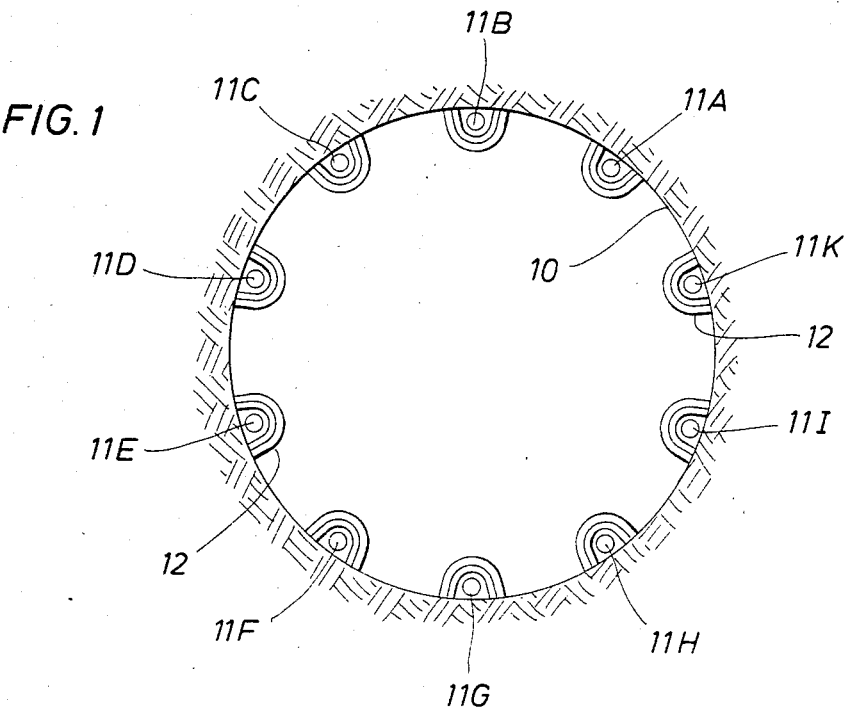
FIG. 2B
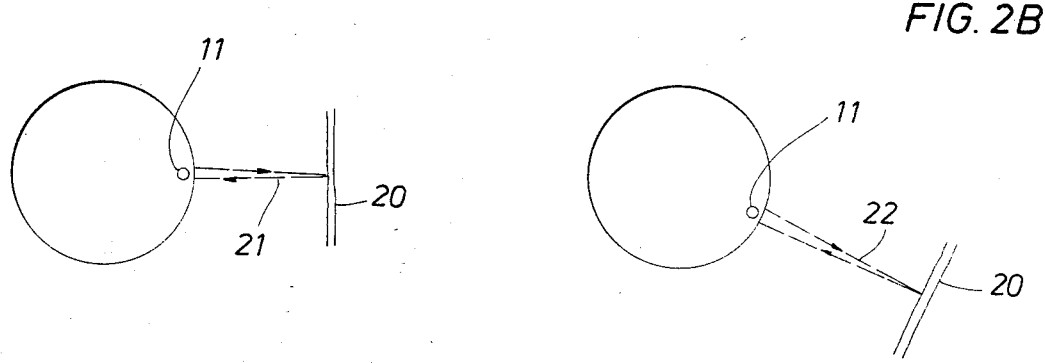
FIG. 2A
FIG. 2C
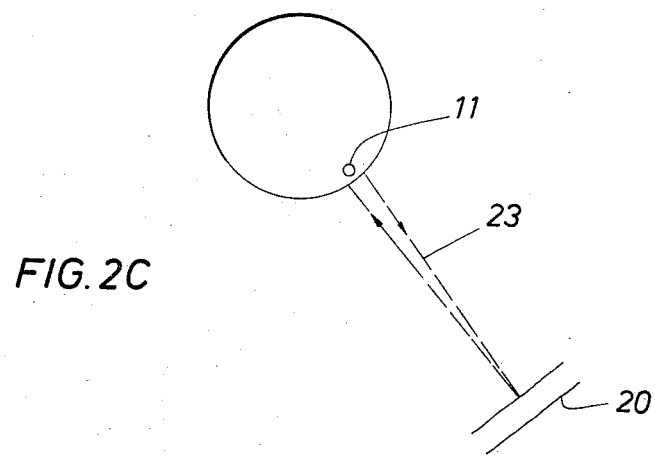

DOWNHOLE FRACTURE ANALYSIS

BACKGROUND OF THE INVENTION

The present invention relates to the evaluation of formations that are penetrated by a borehole in the search for hydrocarbon deposits. Many hydrocarbon deposits are found in fractured reservoirs as contrasted to sand or other types of reservoirs. The presence of a fractured reservoir is difficult to detect from measurements made in the borehole and valuable formations are missed. The difficulty arises from the fact that fractured reservoirs exhibit very small differences in most logging parameters from formations immediately adjacent the fractured formations. Also, since most wells are drilled using drilling mud, the open fractures tend to be sealed by the drilling mud, thus making their actual detection difficult. In addition to the above problems there is a possibility that the borehole does not actually intersect a fracture and that the fractures are located at some distance from the borehole wall. If the fractures could be detected the formation could be produced by inducing fractures in the formation to establish fluid communication between the natural fractures and the borehole.

Several methods have been proposed in an attempt to evaluate fractured formations to determine if fractures are present and if present, if they contain hydrocarbons in commercial quantities. One method consists of using various electrical logs in combination with conventional acoustic logs to detect differences between the various formations penetrated by the borehole and correlate the differences with core samples taken from wells in the same field. A further method is described in U.S. Pat. No. 4,130,816. This patent describes a method and apparatus using four acoustic transducers which are equally spaced circumferentially in a horizontal plane. The apparatus includes means for holding transducers in close proximity to the wall of the borehole with two transducers being used as transmitters and two as receivers. The transducers produce acoustical pulses which travel circumferentially along the borehole wall from the transmitter to the receiver. If a fracture is present, the amplitude of the received acoustic pulse will be reduced over the acoustic pulse received in the absence of fractures. While the apparatus has had success in locating fracture formations, it does have several limitations. For example, the transducers are not in direct contact with the borehole wall and thus they waste considerable acoustic energy in the fluid filling the borehole that interferes with the acoustic signals of interest. Further, since the tool utilizes acoustic waves which travel circumferentially around the borehole wall the depth of penetration is very shallow and fractures which do not intercept the borehole will not be detected.

SUMMARY OF THE INVENTION

The present invention provides a method for analyzing acoustical data obtained by logging a borehole to determine if fractures are present in the formations penetrated by the borehole. The method uses the logging tool described in U.S. Pat. No. 4,130,816 modified to provide a plurality of transducers equally spaced around the circumference of the borehole in a single horizontal plane. Further, the transducers are biased into contact with the wall of the borehole to reduce the production of acoustic waves in the borehole fluid. In addition, the transducers are designed to project energy into the formation so that it penetrates into the formation and is reflected back to the transducers from fractures located beyond the borehole wall. Additional steps are taken to eliminate acoustic waves in the borehole fluid by surrounding the transducers with good acoustical insulation material, for example, sintered metal materials.

The method comprises receiving the reflected acoustic energy and converting it to a corresponding electrical signal. Both cross correlation and auto correlation techniques are then utilized to extract the reflected signal from the background noise. Each transducer in sequence sends out a short (broadband) pulse of acoustic energy and listens for the returning signal. If a fracture is encountered, the returned signal will have more energy at some frequencies and less at others than did the original signal. In other words, the power spectrum (amount of energy at each frequency) of each transducer's returning signal will have maxima and minima that are related to the width of the fracture and the direction of the acoustic energy from that transducer across the fracture. The frequency difference between successive maxima and minima of the returned signal's power spectrum will itself have a minimum for that transducer out of the plurality of transducers whose acoustic energy strikes a fracture substantially normal to the plane of the fracture. Once one has determined which transducer in the array is aligned normal to the plane of the fracture, one can use the frequency difference between its power spectrum's adjacent maxima or minima to determine the width of the fracture. Similarly, the travel time for the acoustic energy from that transducer to the fracture and back to the transducer can be related to the distance of the fracture from the borehole wall.

By utilizing a geographical orientation, for example North, and tracking the position of the transducer which produces the minima signal, one can trace the path of the fracture through the formation as the depth of the logging tool in the borehole is varied. Further, it is possible to track the width of the fracture from the frequency difference and possibly determine whether the fracture contains hydrocarbons or not by changes in the frequency.

BRIEF DESCRIPTION OF THE DRAWINGS

The present invention will be more easily understood from the following detailed description of a preferred embodiment when taken in conjunction with the attached drawings in which:

FIG. 1 is a horizontal or plane view of the position of the transducers in relation to a borehole.

FIGS. 2A-2C are a representation of the transducer in the array that detects the smallest frequency difference between adjacent maxima and minima in its returned signal's power spectrum as the position of the logging tool in the borehole is varied and a fracture changes direction in a formation.

DETAILED DESCRIPTION OF THE PREFERRED EMBODIMENTS

Referring to FIG. 1 there is shown a plane view of one transducer arrangement that can be utilized to practice the present invention. In particular, a plurality of transducers 11A-11K are equally spaced around the circumference of the borehole 10. The transducers may be similar to those described in U.S. Pat. No. 4,130,816 and may be similarly mounted. In particular, the transducers should be mounted so that they are pressed or biased into contact with the borehole wall, for example, conventional bow strings may be utilized to firmly press the transducers into contact with the borehole wall. To eliminate or minimize the acoustic energy that is produced in the borehole fluid molded acoustic sound absorbers are positioned around the back side of the transducers. For example, three molded acoustic absorbers 12 may be positioned around each transducer to effectively reduce the acoustical energy entering the formation fluid. While various materials may be used, it is preferred to use the sintered bronze acoustic absorbers described in copending application Ser. No. 382,535 filed May 27, 1982, now U.S. Pat. No. 4,439,497.

The transducers are preferably energized in sequence to produce acoustic pulses which travel or are projected into the formation and reflected back to the transducer and converted to a corresponding electrical signal. Circuits for doing this are well known in the art and will not be described further. For example, the transducer and circuit arrangement of the above referenced patent may be used while. While the patent shows and describes the use of four transducers, the system can be easily expanded to eight or more transducers. The electrical signals can be partially processed downhole and then transmitted to the surface. For example, it may be desirable to incorporate gain ranging amplifiers and analog-to-digital conversion equipment downhole so that a digital signal can be transmitted to the surface thereby preserving the character of the received signals. In addition to the acoustic transducers it is preferable to provide some means for knowing the orientation of the transducers in the borehole, for example, conventional magnetic means may be utilized to determine the orientation of the transducers with respect to geographical North. Signals reflecting the location of the geographical North can also be transmitted to the surface so that they can be recorded in correlation with the transducer signals.

Referring to FIG. 2, there is shown three positions of a fracture 20 in a borehole in relation to depth. In FIG. 2A, the transducer 11 is located approximately in a horizontal position and detects a smaller frequency difference (between the maxima and minima of its returned signal's power spectrum) than any other transducer in the array because the path 21' of the acoustic energy is substantially normal to the plane of the fracture. In FIG. 2B, the tool is located at some other depth in the borehole. Since the orientation of the fracture has changed, a different transducer in the array is now aligned normal to it and it is the one which detects the smallest frequency difference in its returned signal's power spectrum. Similarly, for FIG. 2C, with the tool located at a different depth and the fracture orientation changed, a third transducer produces the smallest frequency difference. In this example, notice that fracture 20 has widened in going from FIG. 2A to FIG. 2C. Comparing the frequency differences in the power spectrums of those transducers normal to the fracture at each depth, it is clear that the frequency difference will be greatest in FIG. 2A and least in FIG. 2C.

The transducers are highly damped to produce a short acoustic wave train, for example, from one to three cycles. This will produce an acoustic pulse having a broad band of frequencies, i.e., from a fraction of a megacycle to several megacycles which will permit determination of the fracture width as described below. In contrast, most of the previous tools used to detect fractures used very narrow band width acoustic pulses at a relatively high frequency, for example 120 kH.

When the broad band pulse is reflected from a fracture the frequency spectrum will undergo a change depending primarily on the width of the fracture. This frequency change will produce a repeating pattern of maxima and minima which is a result of the constructive and destructive interference of the waves which are reflected from opposite faces of the fracture. It is well known from Bragg's Law that the frequency difference $\Delta f$ between adjacent maxima or minima in a signal can be expressed by the formula $$\Delta f = v/(2w \sin \theta)$$

where
  $v$ = the velocity of sound in the fluid filling the fracture
  $\theta$ = the angle between the incident beam and a plane containing the probed region of the fracture.
  $w$ = the width of the fracture From an inspection of the above expression it can be seen that the minimum $\Delta f$ occurs when $\theta$ equals 90 degrees. Thus, it is clear that the transducer that detects the minima $\Delta f$ is the one that is closest to a line normal to the plane of the fracture. The position of this transducer in the array and the orientation of the transducer relative to the magnetic North can be used to determine the direction of the fracture.

It is obvious that the width of the fracture is approximately $$w = v/(2\Delta f \text{min})$$

It is also obvious that the distance between the transducer detecting the minima $\Delta f$ and the fracture is the product of the speed of sound in the formation times the round trip time of the acoustic pulse. Thus, one is able to measure both the fracture width, its direction and distance from the borehole wall. From this information a three-dimensional view of the fracture, similar to that shown in FIG. 2, can be produced.

As explained above, in order to detect the returning signal in the presence of the noise generated by pressing the transducers against the borehole wall, it is necessary to use correlation techniques. These techniques are well known where the cross-correlation function is the measure of how much one signal resembles a time delayed copy of another. Thus, the pulse and the echo can be considered the two signals and have a maximum value at a time equal to the round trip travel time of the pulse. This will provide a simple method for determining the distance between the borehole and the fracture. Similarly, the autocorrelation function is a measure of how much a signal resembles a time delayed copy of itself. The autocorrelation function has all of the frequency components of the original signal and the Fourier transform of the autocorrelation function is a power spectrum of the signal. Thus, the Fourier transform of the autocorrelation function of the echo will have maxima and minima and one can derive the $\Delta f$ and hence the width of the fracture from it.

The use of signal processing equipment to obtain the cross-correlation and autocorrelation functions of a signal are well known and no detailed description of these systems are believed necessary. The correlators offered by Langley Ford Instruments, 29 Cottage Street, Amherst, Mass., may be used for the signal processing. These correlators can handle multiple inputs and produce visual records. A person can examine the records and locate the fractures and determine their width or the output of the correlator can be further processed in a personal computer to calculate the width of the fracture and its depth using the above expressions. If desired, a special purpose stem may be used to process the signals and provide outputs representing the fracture width and depth. These measurements could be displayed on conventional chart recorders or a cathode ray tube could be used to provide a visual display.

What is claimed is:

1. A method for detecting fractures in a formation surrounding a borehole wall comprising
   irradiating the formation with a broad band width acoustic pulse produced by a transducer in response to a broad band irradiating electrical signal pulse;
   receiving the acoustic energy that is reflected from the formation while discriminating by the time of arrival against energy that is reflected from the borehole wall;
   converting the received acoustic signal to a corresponding electrical signal;
   determining the maxima and minima of the power spectrum of the electrical signal;
   determining the frequency difference between two adjacent power spectrum maxima and minima;
   calculating the width of the fracture using the frequency difference between peaks in the power spectrum from the expression $$\Delta f = \frac{V}{2w\sin\theta}$$

wherein
   $\Delta f$ = frequency difference between peaks in the power spectrum
   $V$ = velocity of sound in the fluid filling the fracture
   $w$ = width of the fracture
   $\theta$ = angle between beam of acoustic pulse and plane containing the probed region of the fracture
   and;
determining the depth of the fracture using velocity of sound in the formation and the time required for the acoustic pulse to travel through the formation and be reflected back.

2. The method of claim 1 wherein a plurality of acoustic pulses are used, said pulses being equally spaced around the periphery of the borehole and produced in sequence.

3. The method of claim 2 wherein said pulses are produced in close proximity to the borehole wall.

4. The method of claim 1 wherein said acoustic pulse comprises a short wave train of not more than five cycles.

5. The method of claim 1 wherein the electrical signals are enhanced using cross-correlation of the irradiating electrical signal with the reflected electrical signal.

6. The method of claim 5 wherein the maximum value of the cross-correlation function is related to twice the depth of the fracture.

7. The method of claim 1 wherein the autocorrelation function of the electrical signal is obtained by correlating the electrical signal with a time delayed copy of the electrical signal and taking the Fourier transform to get the power spectrum from which the spacing between adjacent maxima and minima is determined to obtain the frequency difference.

* * * * *